United States Patent [19]

Rouam

[11] 4,016,851

[45] Apr. 12, 1977

[54] SAFETY CONTROL METHOD AND DEVICE FOR LIMITING THE TEMPERATURE OF A FLUID TO A GIVEN UPPER VALUE

[75] Inventor: Jean Simon René Rouam, Puiseux-en-France, France

[73] Assignee: Societe d'Etudes de Machines Thermiques, Saint Denis, France

[22] Filed: Aug. 22, 1974

[21] Appl. No.: 499,530

[30] Foreign Application Priority Data

Sept. 6, 1973 France .............................. 73.32201

[52] U.S. Cl. .......................... 123/198 D; 73/368.2; 236/98; 123/140 FG

[51] Int. Cl.² ...................................... F02B 77/08

[58] Field of Search .... 123/198 R, 198 D, 198 DB, 123/198 DC, 142, 140 FG, 140 VS; 73/368.3, 368.2; 60/533, 643; 236/98; 251/57, 62

[56] References Cited

UNITED STATES PATENTS

| | | | |
|---|---|---|---|
| 1,719,851 | 7/1929 | Raney | 236/98 X |
| 2,221,347 | 11/1940 | Giesler | 236/98 X |
| 2,475,343 | 7/1949 | Wellman | 73/368.3 X |
| 2,560,005 | 7/1951 | Shawbrook et al. | 236/98 X |
| 2,815,035 | 12/1957 | Iskin et al. | 236/98 UX |
| 3,183,672 | 5/1965 | Morgan | 73/368.3 X |
| 3,301,245 | 1/1967 | Woodburn | 123/198 D |
| 3,599,049 | 8/1971 | Barnard | 123/198 D |
| 3,738,108 | 6/1973 | Goto et al. | 123/198 D X |
| 3,750,640 | 8/1973 | Kuhn | 123/198 D |
| 3,867,919 | 2/1975 | Grenier et al. | 123/198 D |

Primary Examiner—C. J. Husar
Assistant Examiner—Ira S. Lazarus
Attorney, Agent, or Firm—Kenyon & Kenyon Reilly Carr & Chapin

[57] ABSTRACT

A safety control method for limiting the temperature of a fluid to a given upper value comprising the sensing of the fluid temperature and the control of a servo-motor keyed in follow-up relationship to said temperature and acting upon a member controlling a parameter conditioning said temperature, wherein the improvement consists in the steps of effecting the detection so as to cause the displacement of a movable element through the expansion of a liquid heated up to a temperature varying in the same direction as the sensed temperature and transmitting said displacement through a hydraulic circuit relay to a hydraulic ram actuator forming said servo-motor.

17 Claims, 2 Drawing Figures

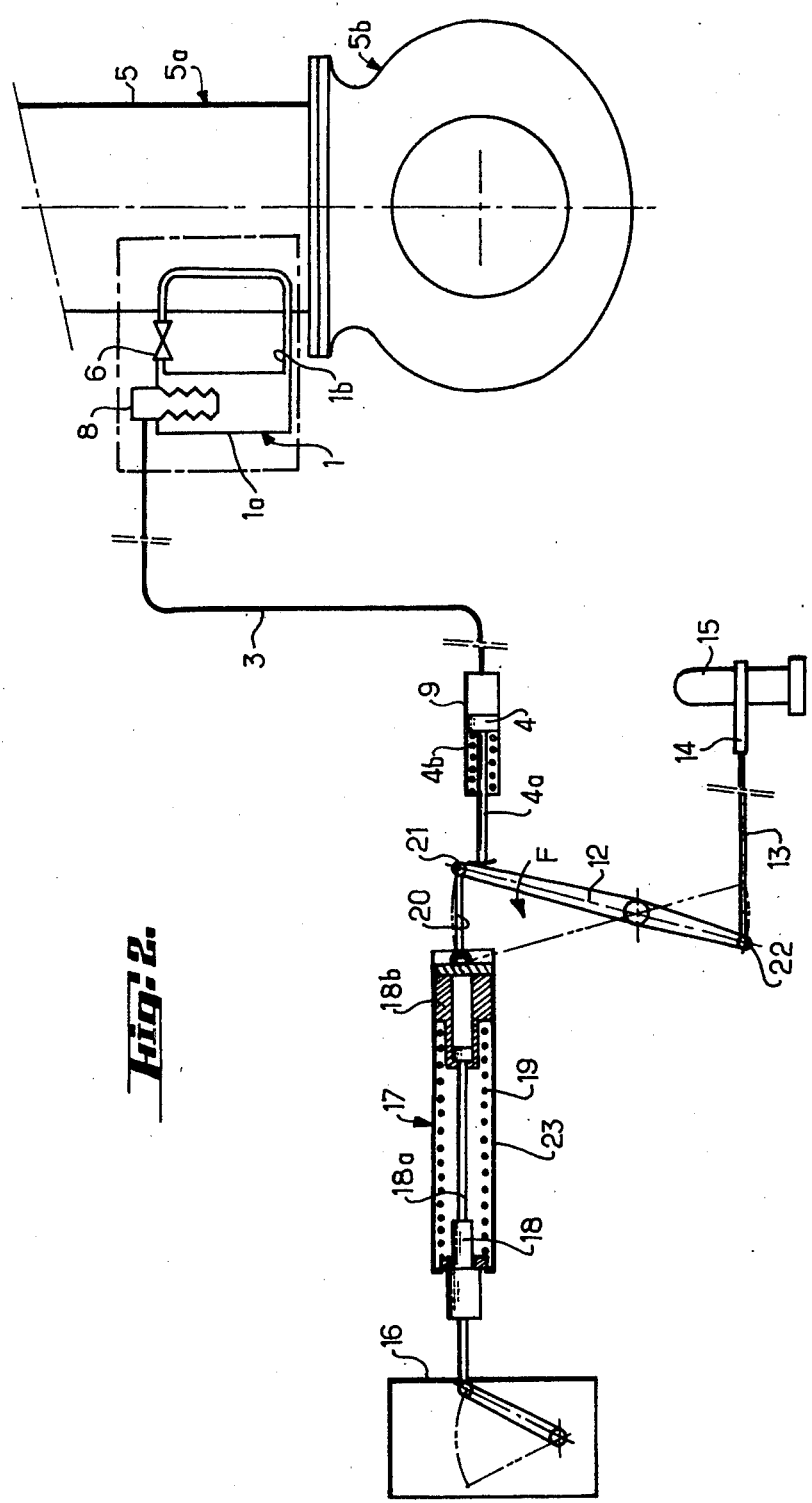

SAFETY CONTROL METHOD AND DEVICE FOR LIMITING THE TEMPERATURE OF A FLUID TO A GIVEN UPPER VALUE

The present invention relates generally to a control process enabling limitation of the temperature of a fluid to a given upper value; it is further directed to devices for carrying out said process.

A more specific object of the present invention consists in applying said methods and devices to limiting the temperature of the exhaust gases of an internal combustion engine below a predetermined upper limit value considered as being abnormal; such applying of the invention is directed to explosion motors or like ignition-controlled internal combustion engines as well as to Diesel-type engines and according to a preferred embodiment the invention relates to applying said processes and device to a fuel-injection, Diesel-type internal combustion engine.

In some cases, for instance when a Diesel locomotive travels through a tunnel the engine is drawing in or sucking burnt air which is at a higher temperature than in the case of open-air travel so that an abnormal rise of the exhaust gas temperature results therefrom with an attendant risk of damaging engine parts. It is therefore conceivable that it may be interesting to have an effective and reliable or dependable means available for limiting the exhaust gas temperature to its permissible maximum value and this whatever the cause of the abnormal rise of the exhaust gas temperature.

The method according one to the present invention enables to overcome said inconvenience.

This method is of the kind comprising the detection or sensing of the fluid temperature and the actuation or controlled operation of a servo-motor keyed in phase-locked or follow-up relationship to this temperature and acting upon a control member adjusting a parameter conditioning said temperature, said method being characterized in that it consists in effecting the detection in such a manner as to cause a displacement of a movable element through expansion of a liquid brought to a temperature varying in the same direction as the sensed temperature and conveying or transmitting said displacement through a hydraulic circuit relay to a hydraulic actuator for example of the linear displacement ram type constituting said servo-motor.

The safety control device for carrying out this method is of the kind comprising a pilot member forming a sensor or detector measuring the fluid temperature and controlling a servo-motor keyed in phase-locked or follow-up relationship to this temperature and acting upon a control member adapted to adjust a parameter conditioning said temperature, this device being characterized in that:

said pilot member is a dilatometer consisting of a vessel or like container filled with a liquid having a high boiling point and coefficient of thermal expansion, said container comprising a tank and a piping mounted on said tank in by-passing branched-off relationship and one portion of which is located within the fluid the temperature of which is to be measured, said governor member including an actuator-like element displaceable under the action of the thermal expansion of the fluid;

it comprises a hydraulic circuit relay connected on the one hand to this dilatometer and on the other hand to said servo-motor;

said servo-motor comprises a hydraulic actuator for instance of the linear displacement power ram type the movable element of which is operated by said hydraulic circuit relay and acts upon said control member.

According to a characterizing feature of the present invention said piping provides communication between the lower or bottom portion and the upper or top portion of said tank so as to cause through thermosiphon effect a liquid flow circulation to build up within said vessel and in order that the temperature of said liquid follows as closely as possible the temperature variations of said fluid.

According to another characterizing feature of the invention, said power actuators are of the linear displacement type; in other words the movable element of the dilatometer consists of a piston as well as the movable element of the hydraulic power actuator of the servo-motor.

According to a particularly advantageous embodiment said hydraulic circuit relay consists of a displacement amplifying circuit which is provided by giving the piston of the dilatometer or the upstream piston a larger cross-sectional area than the piston of the servo-motor actuator or downstream piston.

When applying the present invention to the control of the temperature of the exhaust gases of an internal combustion engine, said tank is located outside of the exhaust manifold and in close proximity thereto by placing the by-pass piping in such a manner that that portion thereof which has to sense the fluid temperature be located inside of the exhaust manifold and the servo-motor control member is operatively connected to the means controlling the fuel flow rate supplied to the engine so that this flow rate be reduced as soon as the exhaust gas temperature tends to exceed the predetermined value considered as being abnormal.

It should be noted that this decrease in the fuel flow rate is obtained according to the present invention independently or irrespective of the will of the engine operator and that it may even be achieved against his will.

Thus, in the case of an abnormal rise of the engine exhaust gas temperature there is available a means enabling to automatically decrease the amount of fuel fed to the engine so as to cause the temperature to decrease down to a normal value and this without any intervention of the engine operator.

a displacement amplifying hydraulic circuit relay one of the ends of which is closed by said piston referred to hereinafter as the upstream piston and the other end of which is closed by another piston of smaller cross-sectional area called hereinafter downstream piston so that the latter undergoes a larger displacement or travel when the upstream system is subjected to a small displacement under the action of the expansion of the liquid within said vessel or container; and mechanical gear means for the transmission of said downstream piston displacement or travel to the means for controlling the fuel flow rate fed to the engine.

A device of the aforesaid kind enables obtention of: a large force for actuating the means controlling the fuel flow rate fed to the engine whatever the power output of the latter; in the case of a big Diesel engine this force should be likely to reach a value up to several tens of kilogrammes in order to act upon the fuel injection pump operating racks so as to move same in spite of or against the resistance opposed by the resilient coupling means and possibly against the will of the engine operator;

a rather large displacement or stroke of the downstream piston for instance of the order of 50 mm thereby providing a good sensitivity;

a least amount of mechanical clearances, backlashes or plays thereby removing the requirement for a displacement amplification by means of a lever; insensitiveness to vibrations;

a time constant of mean or average value which is possibly adjustable so as to avoid oscillations.

According to a further characterizing feature of the present invention the time constant adjustment may be achieved by providing a fluid control cock, tap or valve for said liquid within the piping referred to hereinabove; moreover this time constant may possibly be changed from one engine to another one by using pipings of differing passageway cross-sectional areas on the different engines; on a given engine there may also be possibly provided for the replacement of a piping by another one of different cross-sectional area or of different immersion depth.

The liquid in the vessel or container forming the dilatometer should have a high boiling point and a coefficient of thermal expansion as high as possible, pure glycerin being particularly suitable for this purpose owing to the fact that it not only meets or complies with the aforesaid requirements but also because it is chemically neutral under the operating conditions of the invention.

When using a liquid exhibiting these characteristic properties a displacement or stroke of maximum amplitude of the upstream piston may be obtained due to the heating or warming up of the liquid contained within that portion of the piping which is located inside of the exhaust manifold and in view of the subsequent flow circulation which builds up through thermosiphon effect through the dilatometer tank under conditions such that after some lapse of time a state of thermal equilibrium is attained for every exhaust gas temperature and that the volume of liquid contained within the vessel of the dilatometer increases.

According to still a further characterizing feature of the present invention, the downstream piston or receiving piston acts directly upon the means controlling the fuel flow rate; in the case of a Diesel engine this could for instance be obtained merely by causing the downstream piston to freely bear upon the operating lever for simultaneously actuating the fuel injection pumps control means.

In the case of a fuel injection, Diesel-type internal combustion engine to which the present invention is more particularly directed, the means for controlling the fuel flow rate consisting as known per se of the unitary operating lever, the operating rod or shaft for simultaneously operating the various fuel injection pump control racks, a speed governor controlling the engine speed in accordance with its load and a resilient safety connection or coupling arranged between this governor and said unitary operating lever, the conveyance of the displacement or stroke of said downstream piston to said flow rate control means upon abnormal rise of the exhaust gas temperature may be effected notwithstanding the resistance resulting from an action possibly exerted in the opposite direction by the engine operator and from the resistance opposed by said resilient coupling. This latter possibility may for instance be obtained when the piston of said resilient coupling comprises a first element connected to the governor and a second element connected to said unitary operating lever, both of these elements being capable of moving with respect to each other; thus, as long as the maximum exhaust gas temperature which is permissible is not reached these two elements will be allowed to move in unison owing to the action of a spring bearing upon said second element thereby enabling the normal working of the governor acting upon said first element; on the contrary, when the maximum exhaust gas temperature is reached the second element will be able to move through the medium of said unitary operating lever under the action exerted directly or indirectly by the downstream piston upon said operating lever under conditions such that the governor becomes inoperative.

It should be understood that the invention is also directed to the internal combustion engines, in particular to fuel injection type engines and more specifically to Diesel-type engines which are fitted with a device or which are using the method according to the present invention.

The invention will be better understood and further objects, characterizing features, details and advantages thereof will appear more clearly as the following explanatory description proceeds with reference to the accompanying diagrammatic drawings given by way of non-limiting example only illustrating a specific presently preferred embodiment of the invention and wherein:

FIG. 2 shows a view of a form of embodiment of the device according to the present invention as applied to a Diesel engine.

Figure 1:
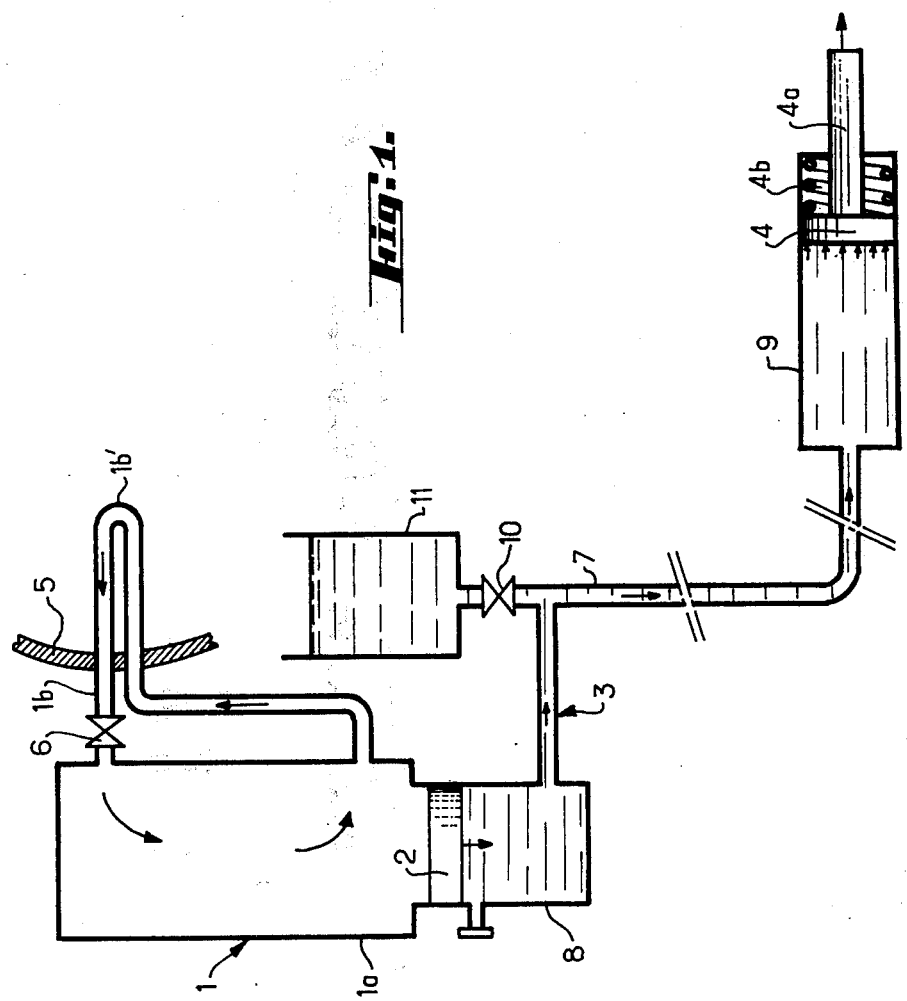
FIG. 1 is a diagram illustrating the principle of the present invention.

With reference to FIG. 1 there is shown a device for controlling the temperature of the exhaust gases of an internal combustion engine, according to the invention, which comprises a dilatometer 1 consisting of a tank 1a and of a pipe or duct 1b interconnecting both opposite top and bottom portions of said tank, an upstream piston closing the tank 1a at its lower or bottom portion, a hydraulic circuit 3 with oil flow circulation terminating at its end remote from the upstream piston 2 into a receiving piston or downstream piston 4, the device further including mechanical gear means for transmitting or conveying the displacement or stroke of the piston 4 to the means controlling the fuel flow rate supplied to the engine.

The pipe 1b comprises one portion or section 1b' located inside of the exhaust manifold of an engine diagrammatically shown herein at 5; this pipe or duct 1b comprises a flow rate control cock, tap or valve 6; the whole of the vessel or container of said dilatometer 1 consisting of the tank 1a and of the pipe 1b holds a liquid having a high boiling point and the highest possible coefficient of thermal expansion. Such a liquid may for instance consist of pure glycerin, a substance which is chemically neutral with respect to the materials with which it is in contact in the present device.

The hydraulic circuit 3 consists of a main duct line 7 comprising at each one of its ends a power ram actuator 8 or 9 the pistons of which are the pistons 2 and 4, respectively, this duct line being connected through the medium of a cut-off valve 10 to a supply body 11 of hydraulic fluid.

The piston 4 actuates through mechanical gear or transmission means which may possibly be reduced to the piston rod 4a alone, the fuel flow rate control means as for instance the fuel injection pump operating lever of a Diesel engine.

The device according to FIG. 1 works in the following manner:

The section 1b' positioned within the exhaust manifold 5 is heated or warmed up upon the start of the engine so that the liquid contained therein has its temperature becoming higher than the temperature of the tank 1a; therefore, a circulation is built up between this piping and this tank through thermosiphon effect. A state of equilibrium is established with the obtainment of a temperature within the tank 1a depending upon the temperature inside of the exhaust manifold, this temperature varying in the same direction. The device is designed so that the displacements or strokes of the piston 2 owing to the thermal expansion of the liquid of the dilatometer 1 are small or short and without any influence upon the means controlling the fuel flow rate supplied to the engine as long as the exhaust gas temperature does not exceed a value deemed to be abnormal. When this value is exceeded however, the expansion of the liquid within the dilatometer and therefore the displacements or strokes of the pistons 2 and 4 are such that the fuel flow rate control means are actuated so as to slow down this flow rate for instance in the manner which will be shown hereinafter with reference to FIG. 2.

It should be noted that the hydraulic circuit 3 provision of an amplification of the displacements of the movable members owing to the fact that in the preferred embodiment of the present invention as shown in FIG. 1 the receiving piston or downstream piston 4 has a smaller cross-sectional area and therefore undergoes a larger displacement than the power or drive piston or upstream piston 2.

As soon as the temperature within the exhaust manifold 5 decreases below the value considered as being abnormal the thermal contraction of the liquid contained within the dilatometer has of course the effect of returning or bringing the pistons 2 and 4 back to their equilibrium positions in view of the action of suitable biasing or draw-back means such as preferably the action of a return spring 4b acting upon the piston 4 of the power ram actuator 9.

The time constant of the device may be adjusted by operating the control cock or valve 6 (decrease in response time or time constant through increase of the liquid passageway cross-sectional area within the duct or line 1b).

On the right-hand side portion of FIG. 2 are shown the same elements as in FIG. 1, namely the dilatometer 1, the power ram actuator 8, the hydraulic circuit 3, the power ram actuator 9 and the exhaust manifold 5; in the present instance the pipe 1b more specifically extends or projects into that portion of the exhaust manifold 5 which constitutes the exhaust gas outlet, exit or egress 5a of the turbine 5b usually arranged within the exhaust system of Diesel engines.

The means for controlling the fuel flow rate supplied to the engine are diagrammatically shown herein as consisting of the unitary operating lever 12, the unitary operating rod or link 13 and one of the toothed racks 14 of one of the fuel injection pumps such as the injection pump 15; of course as known per se, the operating rod or link 13 simultaneously drives all the control racks of the various injection pumps so as to be able to change the fuel injection flow rate.

There is also shown in this Figure a self-acting engine speed governor 16 which acts through the medium of a resilient coupling generally designated by the reference numeral 17 upon that end of the operating lever 12 which is located at the lever end connected to the operating rod or link 13; the piston 18 which conveys the operating force controlling the fuel flow rate called for by the governor 16 consists in the present instance of a first element 18a adapted to slide within a second element 18b against which is seated or bearing the spring 19, the conveying of the control action being carried out by means of the rod 20 pivotally connected on the one hand to the second element 18b and on the other hand to the other end 21 of the operating lever 12 which is opposite from the end 22 to which the operating link 13 is pivotally connected.

The regulating action of the device according to the present invention when the exhaust gas temperature has exceeded a value considered as being abnormal is carried out through a direct action of the rod 4a of the downstream piston 4 upon one of the ends of the operating lever 12; the conveyance of this action is effected merely by pushing or through a simple thrust without any connection between said operating lever and said piston rod 4a for the grounds which will become apparent hereinafter.

FIG. 2 illustrates a state of the device and of the speed governor in the case where the governor calls for a maximum speed and where the piston 4a is about to engage or contact the operating lever 12; if it is assumed for instance that the Diesel engine which is referred to herein is a locomotive engine and that this locomotive has just entered a tunnel then an abnormal rise of the engine exhaust gas temperature will occur due to the fact that the engine is drawing in or sucking again hot or warm air so that the piston 4 will move to the left while pushing the operating lever 12 in the direction shown by the arrow F thereby immediately causing a decrease in the injection flow rate; it should be noted that this action is carried out in spite of the resistance opposed by the resilient coupling 17: said displacement of the lever 12 has indeed the effect of pushing to the left the piston element 18b which then slides within the tube 23 while compressing the spring 19; it should be noted that in view of the specific arrangement of the elements 18a and 18b of the piston 18 there occurs a relative sliding motion of the element 18a within the element 18b without the element 18a having been displaced; thus the governor 16 is inoperative at that time, i.e. it cannot oppose or withstand the displacement of the operating lever 12 achieved under the thrust or pushing action of the piston 4 and therefore it cannot oppose or impede the increase in fuel flow rate and this until the exhaust gas temperature becomes normal again.

The advantages of the device according to the present invention are easily conceivable and well apparent, which device enables the remote-control of the output flow rate of the injection pumps in accordance with the value of the exhaust gas temperature and this possibly notwithstanding the resistance opposed by the resilient coupling and/or the opposed will of the engine operator.

It should be understood that the present invention is not at all limited to the form of embodiment described and shown which has been given by way of example only. In particular it comprises all the means constituting technical equivalents of the means described as well as their combinations if same are carried out according to its gist and used within the scope of the appended claims.

What is claimed is:

1. In an internal combustion engine including an exhaust manifold, a safety device for controlling the temperature of the exhaust gas in said exhaust manifold, comprising:
a pilot member forming a detecting sensor for measuring the exhaust gas temperature; a servo-motor operated by said pilot member and keyed in phase-locked relationship to this temperature; a control member operated by said servo-motor for adjusting a parameter conditioning said temperature, said pilot member being a dilatometer comprising a vessel filled with a liquid having a high boiling point and coefficient of thermal expansion, said vessel comprising a tank and piping mounted in by-passing relationship on said tank, one portion of said piping being located in the flow path of said exhaust gas the temperature of which is to be measured, said pilot member comprising an actuator-like element displaceable under the action of thermal expansion of said liquid; a hydraulic circuit relay connected to said dilatometer and to said servo-motor, said servo-motor comprising a hydraulic power ram actuator having a movable element, said movable element being displaceably operated by said hydraulic circuit relay and acting upon said control member, and said one portion of said piping being positioned inside of the exhaust manifold of said engine; and means actuated by said control member for controlling fuel flow rate fed to said engine by reducing this flow rate as soon as the exhaust gas temperature tends to exceed a given upper limit value.

2. A device according to claim 1, wherein said control member includes means for conveying the displacement of the movable element of said servo-motor actuator to said fuel flow rate control means.

3. An engine according to claim 1, wherein said engine is a fluid injection, Diesel-type internal combustion engine and said fuel flow rate control means comprises a unitary operating lever and a unitary operating rod for actuating in unison various injection pump control racks, an engine speed governor adjusting the engine speed against its load and a resilient coupling element arranged between said governor and said unitary operating lever, whereby the conveyance of the displacement of said movable element of said servo-motor actuator to said fuel flow rate control means takes place in spite of the resistance resulting from an action exerted in the opposite direction by an engine operator and notwithstanding the resistance opposed by said resilient element.

4. An engine according to claim 3, wherein said resilient coupling comprises a piston, including a first element connected to said governor and a second element connected to said unitary operating lever both of these elements being adapted to move in relation to each other and a spring bearing on said second element so that said elements may actually move in unison owing to the action of said spring bearing upon said second element and to the direct action of said governor upon said first element as long as the permissible maximum exhaust gas temperature has not been reached and so that said second element may move independently of said first element under the action exerted by said unitary operating lever through said servo-motor piston as soon as said permissible maximum exhaust gas temperature tends to be exceeded.

5. An engine according to claim 1, including a biasing return spring for urging said movable element of said servo-motor actuator back to its return position.

6. An engine according to claim 1 wherein said liquid is chemically neutral under operating conditions of said engine.

7. An engine according to claim 1 wherein said liquid is glycerin.

8. In combination with an internal combustion engine including at least one exhaust manifold and power output controlling means, a self-acting thermostatic control device fitting said engine for limiting the exhaust gas temperature thereof to a given upper value, said device comprising: at least one tank located outside of said exhaust manifold and having its top portion and its bottom portion formed each one with an open port; a by-pass pipe interconnecting said ports for providing permanent flow communication therebetween, said tank and by-pass pipe forming together a closed loop completely filled with a thermally expansible liquid having a high boiling point and coefficient of thermal expansion, at least one intermediate section of said by-pass pipe extending into said exhaust manifold to project into the flow path of said exhaust gas; said tank having at least one first liquid expansion-responsive linearly reversibly movable guided wall portion whereby said volume of said tank is variable through relative displacement of said wall portion; and a hydraulic power transmitting system comprising a sealed enclosure connected and directly adjacent to said tank and entirely filled with a pressure-transferring substantially incompressible liquid, said enclosure being separated from said tank in sealed relationship at least by said first movable wall portion which is thus common to both of said tank and enclosure; said enclosure having at least a second pressure-responsive linearly reversibly movable guided wall portion remote from said first one and operatively connected to said power output controlling means for automatically displacing same in a power output reduction direction upon outward displacement of said second movable wall portion when said exhaust gas temperature tends to exceed said upper limit value.

9. An engine according to claim 8, wherein said by-pass pipe is provided with selectively operable throttle valve means for locally varying the free passage-way cross-section of said pipe.

10. An engine according to claim 8, wherein said thermally expansible liquid in glycerine.

11. An engine according to claim 8, comprising resilient biasing means urging said second movable wall portion back to its initial neutral position for releasing any action upon said power output controlling means when said exhaust gas temperature has dropped below said upper limit value.

12. An engine according to claim 8, wherein said enclosure comprises a first variable cylindrical working chamber portion contiguous to said tank and closed endwise by a first piston slidable therein, said first piston forming said first movable wall portion.

13. An engine according to claim 12, wherein said enclosure comprises a second variable cylindrical working chamber portion closed endwise by a second piston slidable therein, said second piston forming said second movable wall portion to constitute together with said second working chamber portion a linear-displacement type ram-like actuator, and a duct line interconnecting both working chambers for permanent communication therebetween.

14. An engine according to claim 13, wherein said second piston is loaded by return spring means.

15. An engine according to claim 8, comprising at least one storage container holding a supply of make-up liquid and connected through stopcock means to said enclosure.

16. An engine according to claim 8, of the Diesel type with fuel injection pump means provided with unitary fuel delivery flow rate control means, wherein said power output control means comprise: an atomatic speed governor; a linkage operatively connecting the output of said speed governor to said fuel delivery flow rate control means; resiliently compressible and contractable coupling means inserted in series in said linkage and providing, under normal unconstrained operating conditions, substantially positive transmission of flow rate decreasing pull and flow rate increasing push forces from said speed governor in opposite directions, respectively; a push-rod rigidly connected to said second movable wall portion and releasably engageable freely with said linkage at a point located between said coupling means and said flow rate control means so as to shift the latter in the flow rate decreasing and coupling-contracting direction while overcoming the resiliently compressive resistance of said coupling means; and return means biassing said second movable wall portion towards its inoperative position for retracting said push-rod and disengage same from said linkage upon contraction of said thermally expansible liquid.

17. An engine according to claim 16, wherein said coupling means comprises: an extensible and contractable telescopic member consisting of two component elements arranged in substantially coaxially registering relationship and slidably connected to each other so as to be relatively movable towards and away from each other between one end abutment position of minimum member length and one opposite end abutment position of maximum member length; and compression spring means mounted in coaxial relationship between said elements to urge them apart and keep them in the fully extended position of said telescopic member, the elastic force of said spring means being high enough to positively convey any push forces from said governor.

* * * * *